(12) United States Patent
Kato et al.

(10) Patent No.: US 8,139,341 B2
(45) Date of Patent: Mar. 20, 2012

(54) FILM CAPACITOR

(75) Inventors: Yoshikuni Kato, Miyakonojo (JP);
Katsuo Koizumi, Miyakonojo (JP);
Kanji Machida, Yawata (JP)

(73) Assignee: Soshin Electric Co., Ltd., Saku (JP)

( * ) Notice: Subject to any disclaimer, the term of this patent is extended or adjusted under 35 U.S.C. 154(b) by 611 days.

(21) Appl. No.: 12/300,645

(22) PCT Filed: May 30, 2007

(86) PCT No.: PCT/JP2007/061027
§ 371 (c)(1),
(2), (4) Date: Nov. 13, 2008

(87) PCT Pub. No.: WO2007/139165
PCT Pub. Date: Dec. 6, 2007

(65) Prior Publication Data
US 2009/0185326 A1 Jul. 23, 2009

(30) Foreign Application Priority Data

May 31, 2006 (JP) .................................. 2006-150888

(51) Int. Cl.
*H01G 4/30* (2006.01)
*H01G 4/32* (2006.01)
*H01G 4/005* (2006.01)
*H01G 4/012* (2006.01)
*H01G 4/008* (2006.01)

(52) U.S. Cl. .................. 361/301.4; 361/301.5; 361/303; 361/304; 361/305

(58) Field of Classification Search ............... 361/301.5, 361/303, 304, 305, 301.4
See application file for complete search history.

(56) References Cited

U.S. PATENT DOCUMENTS

| | | | |
|---|---|---|---|
| 4,504,884 A | | 3/1985 | Vetter |
| 4,959,748 A | * | 9/1990 | Kimura et al. ................. 361/323 |
| 6,040,038 A | | 3/2000 | Momose |
| 6,370,008 B1 | | 4/2002 | Vetter |
| 7,027,286 B2 | | 4/2006 | Shiota et al. |
| 7,724,495 B2 | * | 5/2010 | Fuhrmann et al. ......... 361/301.5 |

FOREIGN PATENT DOCUMENTS

| | | |
|---|---|---|
| EP | 0 438 344 A1 | 7/1991 |
| EP | 1 868 216 A1 | 12/2007 |
| EP | 1 868 217 A1 | 12/2007 |

(Continued)

OTHER PUBLICATIONS

U.S. Appl. No. 12/298,372, filed Oct. 24, 2008, Kato et al.

*Primary Examiner* — Eric Thomas
*Assistant Examiner* — Arun Ramaswamy
(74) *Attorney, Agent, or Firm* — Burr & Brown

(57) ABSTRACT

A film capacitor comprises a wound body, a first terminal part electrically connected to one end of the wound body, and a second terminal part electrically connected to the other end of the wound body. The wound body is structured by winding into a laminate a first film laminate formed of a laminate of dielectric films and having therein a floating electrode and a second film laminate formed of a laminate of first and second metal films sandwiching the first film laminate and dielectric films and having therein a floating electrode (22). Each of the floating electrodes (22) is composed of integrated small electrodes independent of each other.

8 Claims, 10 Drawing Sheets

FOREIGN PATENT DOCUMENTS

| | | | |
|---|---|---|---|
| GB | 1066461 | A1 | 4/1967 |
| JP | 132759 | C | 11/1939 |
| JP | 41-011377 | A1 | 6/1966 |
| JP | 57-024727 | U1 | 2/1982 |
| JP | 57-040915 | A1 | 3/1982 |
| JP | 60-076028 | A1 | 5/1985 |
| JP | 02-121320 | A1 | 5/1990 |
| JP | 03-077426 | U1 | 8/1991 |
| JP | 06-302468 | A1 | 10/1994 |
| JP | 06-310368 | A1 | 11/1994 |
| JP | 07-263269 | A1 | 10/1995 |
| JP | 08-288171 | A1 | 11/1996 |
| JP | 2590357 | B2 | 12/1996 |
| JP | 09-199371 | A1 | 7/1997 |
| JP | 09-283366 | A1 | 10/1997 |
| JP | 11-045819 | A1 | 2/1999 |
| JP | 2002-504747 | A1 | 2/2002 |
| JP | 2002-324719 | A1 | 11/2002 |
| JP | 2004-134561 | A1 | 4/2004 |
| JP | 3710873 | B2 | 8/2005 |
| WO | 01/11637 | A1 | 2/2001 |
| WO | 2004/034412 | A1 | 4/2004 |

\* cited by examiner

FILM CAPACITOR

FIELD OF THE INVENTION

The present invention relates to a film capacitor comprising a rolled assembly of stacked films, which has a stack of dielectric films and includes a floating electrode therein, a first terminal electrically connected to one end of the roll, and a second terminal electrically connected to the other end of the roll, and more particularly to a film capacitor, which has a self-healing function and a self-protective function.

BACKGROUND OF THE INVENTION

Film capacitors having a self-healing function are disclosed in Patent Documents 1 through 4, for example.

The film capacitor disclosed in Patent Document 1 includes a pair of capacitor electrodes, which confront each other with a dielectric film sandwiched therebetween. At least one of the capacitor electrodes is formed by metal evaporation, and is divided equally into spaced or arbitrarily spaced intervals in the longitudinal direction of the film by a plurality of insulating grooves, thereby providing a plurality of segmented electrode banks. The segmented electrode banks comprise electrodes formed by a network of insulating grooves, with a plurality of narrow current paths left therebetween.

The capacitor electrodes that sandwich the dielectric film serve as a metalized film having 2 to 20 independent small electrodes arrayed in the longitudinal direction of the film, and a plurality of independent small electrodes arrayed in the transverse direction of the film. The metalized film is coiled into a roll, and metal is sprayed onto opposite end faces of the roll to form terminal electrodes, thus producing a capacitor element. One or more capacitor elements are encased within the film capacitor.

The film capacitor disclosed in Patent Document 2 comprises a dielectric film and a metal-evaporated electrode disposed on one side of the dielectric film. The metal-evaporated electrode includes a plurality of divided electrodes arrayed in longitudinal and transverse directions thereof. The divided electrodes are segmented by non-electrode margins. Margin fuses having a fuse function are disposed within the margins. The margin fuses are superposed over other margin fuses provided on upper and lower confronting electrodes.

The film capacitor disclosed in Patent Document 3 is a sheet capacitor, which comprises a dielectric capacitor sheet having a thin metal film thereon and which is coiled into a capacitor roll in a direction in which the dielectric capacitor sheet extends. The film capacitor includes a metalized region, which includes the thin metal film with divisions therein. The thin metal film has a partially divided section extending transverse to the direction in which the dielectric capacitor sheet extends.

The film capacitor disclosed in Patent Document 4 includes a pair of evaporated electrodes having divided electrodes connected in parallel with each other by fuses, and which extend from a substantially transverse central region toward insulated margins that reside in an effective electrode area providing a capacitance. Since the fuses and the divided electrodes are disposed closely to the insulated margins, where reduced currents flow at positions spaced from components plated by sprayed metal, the heat produced by the fuses is reduced so as to lower a rise in temperature.

Ceramic capacitors having a floating electrode within a sintered dielectric substrate, which are different from film capacitors having floating electrodes within a stacked film assembly made up of a stack of dielectric films, are disclosed in Patent Documents 5 through 7, for example.

A film capacitor comprising a rolled polypropylene film, which supports thereon two electrodes disposed along the transverse direction of the polypropylene film and which are connected in series to each other, is disclosed in Patent Document 8, for example.

Patent Document 1: Japanese Patent No. 3710873;
Patent Document 2: Japanese Laid-Open Patent Publication No. 09-199371;
Patent Document 3: Japanese Laid-Open Patent Publication No. 2002-504747;
Patent Document 4: Japanese Laid-Open Patent Publication No. 2004-134561;
Patent Document 5: Japanese Laid-Open Patent Publication No. 07-263269;
Patent Document 6: Japanese Patent Publication No. 2590357;
Patent Document 7: Japanese Laid-Open Utility Model Publication No. 60-076028; and
Patent Document 8: Japanese Laid-Open Patent Publication No. 08-288171.

SUMMARY OF THE INVENTION

It is known that the floating electrodes of ceramic capacitors may be connected in series to each other in order to provide a higher withstand voltage. However, unlike film capacitors, since the floating electrodes are disposed within the sintered dielectric substrate, the ceramic capacitors fail to have both a self-healing function and a self-protective function.

According to the film capacitor disclosed in Patent Document 8, the evaporated film that forms a fuse between the electrodes has an increased thickness for heat control. However, the disclosed structure is not sufficient for providing a desired heat control.

The present invention has been made in view of the above problems. It is an object of the present invention to provide a film capacitor, which has a high withstand voltage achieved as an advantage of providing a floating electrode. Further, the film capacitor has a heat radiation capability, and both a self-healing function and a self-protective function, and thus, the film capacitor is capable of being used in various applications.

A film capacitor according to the present invention comprises a roll having a stacked structure, including a first stacked film assembly, which has a stack of dielectric films including a floating electrode therein, a first metal film and a second metal film disposed in sandwiching relation to the first stacked film assembly on opposite surfaces thereof, and a second stacked film assembly, which has a stack of dielectric films including a floating electrode therein, a first terminal electrically connected to an end of the roll, and a second terminal electrically connected to another end of the roll, wherein the floating electrode comprises a cluster of small electrodes that are independent of each other, each of the small electrodes and the first metal film form a capacitor therebetween, and each of the small electrodes and the second metal film form a capacitor therebetween, and further wherein the first electrode film extends to a side edge of the first stacked film assembly so as to be electrically connected to the first terminal, and the second electrode film extends to another side edge of the first stacked film assembly so as to be electrically connected to the second terminal.

In the event of a fault of the film capacitor, the capacitance thereof is prevented from being greatly lowered because the capacitance can be electrically separated by the individual small electrodes. The first metal film and the second metal film, which sandwich the first stacked film assembly on opposite surfaces thereof, can serve as lead-out electrodes. Since the first metal film and the second metal film can be formed over a wide area, the films can effectively be used as a heat radiation path.

The film capacitor according to the present invention has a high withstand voltage, achieved as an advantage of providing the floating electrode. Further, the film capacitor has a heat radiation capability, and both a self-healing function and a self-protective function, and thus, the film capacitor is capable of being used in various applications.

According to the present invention, the first stacked film assembly comprises at least one stack made up from a dielectric film, which is free of the floating electrode, and a dielectric film that includes the floating electrode therein.

Alternatively, the first stacked film assembly comprises at least one stack made up of at least two dielectric films, each having the floating electrode therein.

According to the present invention, the small electrodes may be formed by evaporating a metal film onto one of the dielectric films of the first stacked film assembly.

Each of the small electrodes may have a rectangular shape, the small electrodes being arrayed in a matrix on the dielectric film.

Each of the small electrodes may have a hexagonal shape, the small electrodes being arrayed in a honeycomb pattern on the dielectric film.

The first metal film is evaporated onto a principal surface of a dielectric film stacked on a stack of the dielectric films, and the second metal film is evaporated onto a principal surface of another dielectric film stacked on the stack.

The dielectric films that make up the first stacked film assembly and the second stacked film assembly may have transversely opposite undulated edges. Such undulated edges may be of a waveform such as a sine waveform, a triangular waveform, or a semicircular waveform.

As described above, the film capacitor according to the present invention has a high withstand voltage achieved as an advantage of providing the floating electrode. Further, the film capacitor has a heat radiation capability, and both a self-healing function and a self-protective function, and thus, the film capacitor is capable of being used in various applications.

DETAILED DESCRIPTION OF THE INVENTION

Embodiments of film capacitors according to the present invention will be described below with reference to FIGS. 1 through 10.

Figure 1:
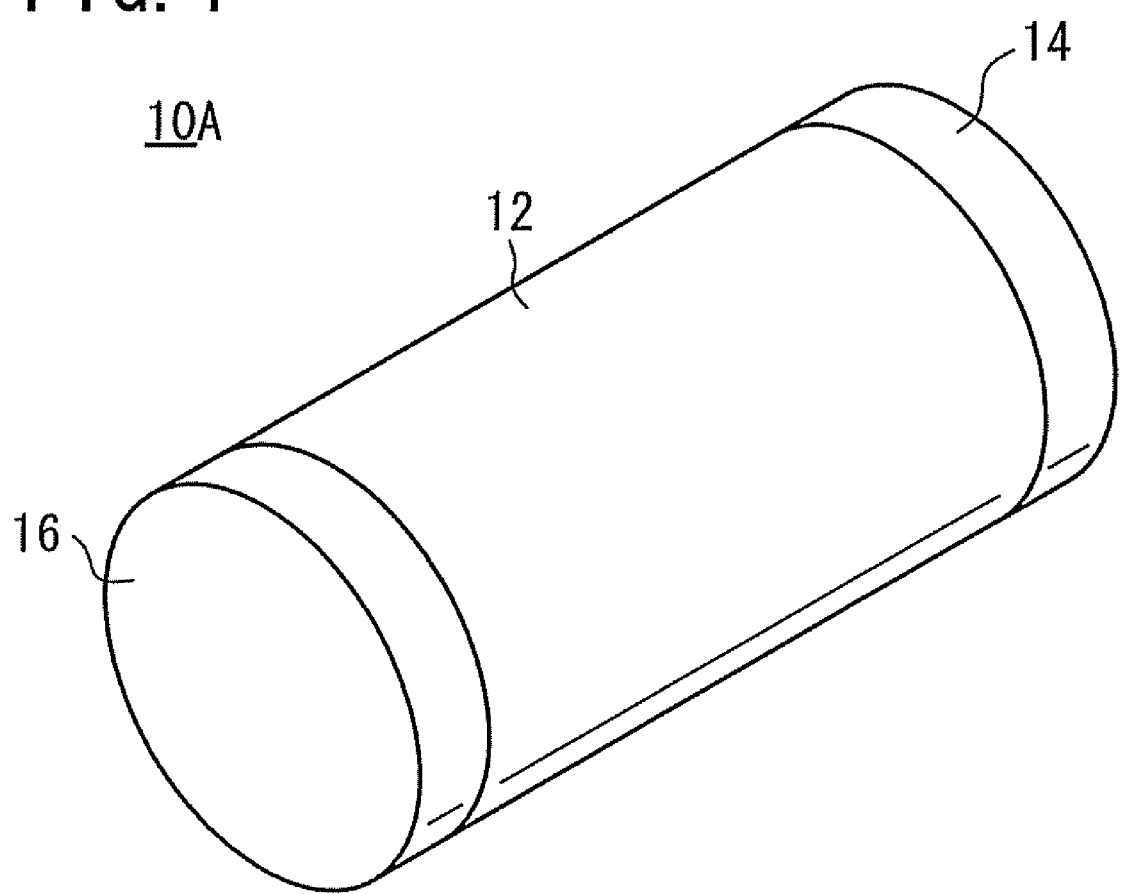
FIG. 1 is a perspective view showing an example of an outer shape of a first film capacitor.

As shown in FIG. 1, a film capacitor according to a first embodiment of the present invention (hereinafter referred to as a "first film capacitor 10A") comprises a roll 12, a first terminal 14 electrically connected to an end of the roll 12, and a second terminal 16 electrically connected to another end of the roll 12.

Figure 2:
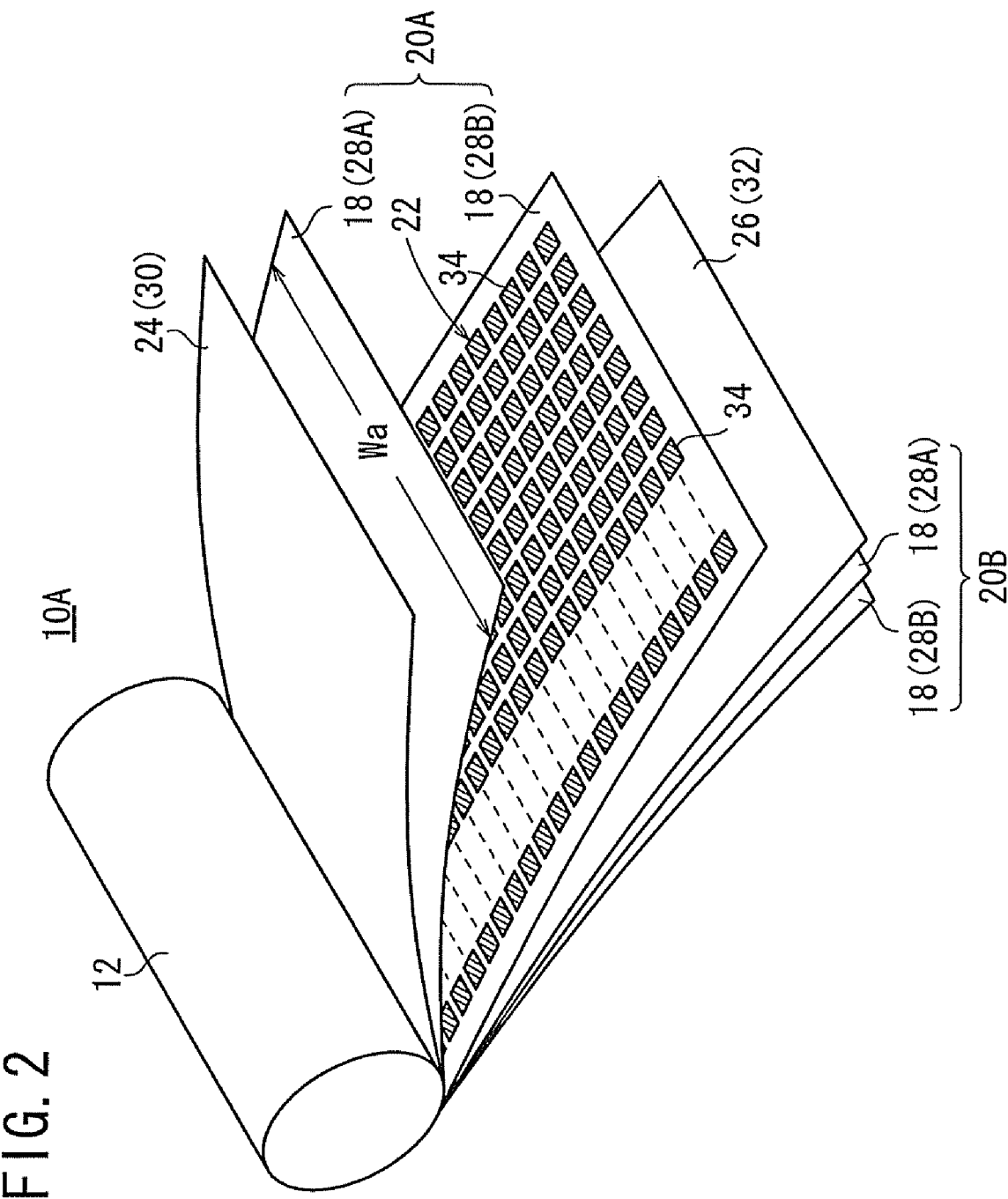
FIG. 2 is a perspective view, partially omitted from illustration, of the structure of a roll of the first film capacitor.

As shown in FIG. 2, the roll 12 includes at least two stacked film assemblies (a first stacked film assembly 20A and a second stacked film assembly 20B) each comprising a stack of dielectric films 18.

The first stacked film assembly 20A and the second stacked film assembly 20B each includes a floating electrode 22 therein. The first stacked film assembly 20A is sandwiched between a first metal film 24 and a second metal film 26 disposed on opposite surfaces thereof.

The roll 12 comprises a coiled stack made up of the first metal film 24, the first stacked film assembly 20A, the second metal film 26, and the second stacked film assembly 20B.

Figure 3:
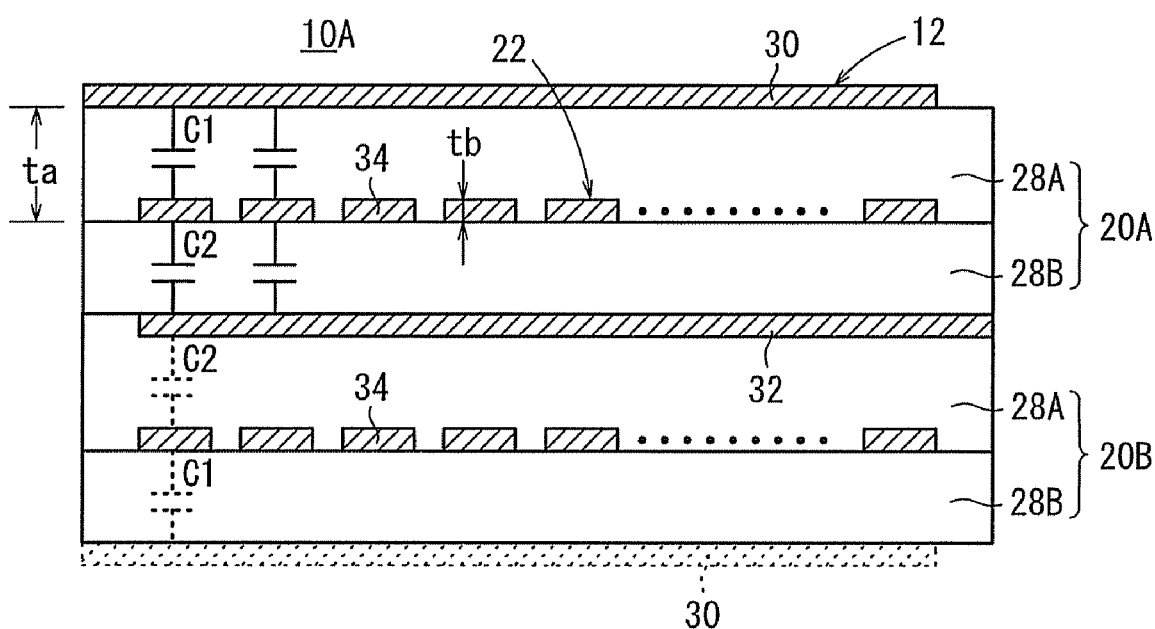
FIG. 3 is a cross-sectional view, partially omitted from illustration, of the structure of the first film capacitor.

As shown in FIGS. 2 and 3, the roll 12 of the first film capacitor 10A is made up of the first stacked film assembly 20A, which comprises a stack formed by a first dielectric film 28A and a second dielectric film 28B, the floating electrode 22, which is evaporated onto a principal surface of the second dielectric film 28B, a first metal foil 30 (first metal film 24) disposed on a principal surface (e.g., an upper surface) of the first stacked film assembly 20A, a second metal foil 32 (second metal film 26) disposed on another principal surface (e.g., a lower surface) of the first stacked film assembly 20A, and the second stacked film assembly 20A, which comprises a stack formed by a first dielectric film 28A and a second dielectric film 28B.

Figure 4A:
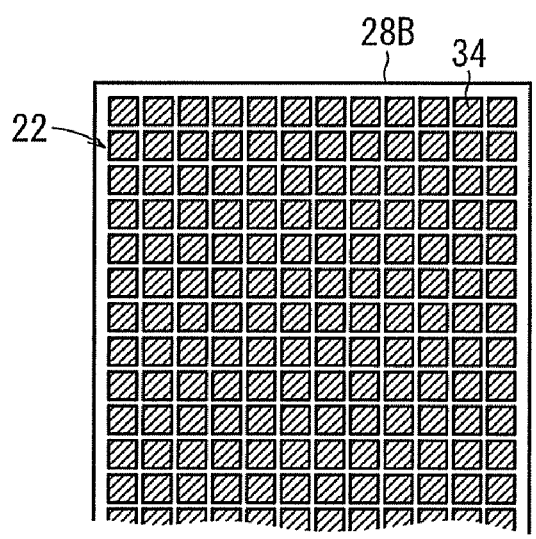
FIG. 4A is a view showing an example of the shape and layout of the small electrodes of a floating electrode.
Figure 4B:
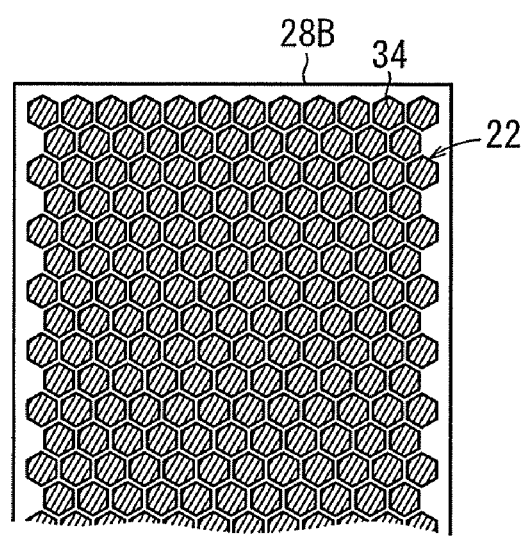
FIG. 4B is a view showing another example of the shape and layout of the small electrodes.

The floating electrode 22 comprises a cluster of small electrodes 34, which are independent from each other. The small electrodes 34 may be of geometrical shapes such as polygonal shapes, circular shapes, etc., or irregular shapes such as leopard spots, or a mixture of such shapes. The small electrodes 34 may be positioned at equally spaced or arbitrarily spaced intervals. In the film capacitor 10A shown in FIG. 4A, the small electrodes 34 are each of a rectangular shape and are arrayed in a matrix on a principal surface of the second dielectric film 28B. Alternatively, as shown in FIG. 4B, the small electrodes 34 are each of a hexagonal shape and are arrayed in a honeycomb pattern on a principal surface of the second dielectric film 28B.

As shown in FIG. 3, each of the small electrodes 34 and the first metal foil 30 form a first capacitor C1 therebetween, whereas each of the small electrodes 34 and the second metal foil 32 form a second capacitor C2 therebetween.

The second stacked film assembly 20B is of the same structure. When the components are coiled together to form the roll 12, the first metal foil 30 is positioned on the lower surface of the second stacked film assembly 20B. Therefore, each of the small electrodes 34 of the second stacked film assembly 20B and the first metal foil 30 form a first capacitor C1 therebetween, whereas each of the small electrodes 34 of the second stacked film assembly 20B and the second metal foil 32 form a second capacitor C2 therebetween.

The first dielectric film 28A and the second dielectric film 28B may be made of PP (polypropylene), PET (polyethylene terephthalate), PPS (polyphenylene sulfide), or the like. The first dielectric film 28A and the second dielectric film 28B have a width Wa (see FIG. 2) in a range from 10 to 200 mm, and a thickness ta (see FIG. 3) in a range from 2.0 to 30 μm.

The small electrodes 34 of the floating electrodes 22 may be made of aluminum, zinc, or an alloy of aluminum and zinc, or the like. The floating electrodes 22 have a thickness tb (see FIG. 3) which satisfies a surface resistance within a range from 1 to 20 ohms/mm$^2$. The thickness tb may be in a range from 100 to 1000 Angstroms, for example.

The first film capacitor 10A has a rated capacitance value that ranges from about several tens μF to several hundreds μF, a rated voltage of several hundreds V (DC), and a rated current of several tens A.

Figure 5:
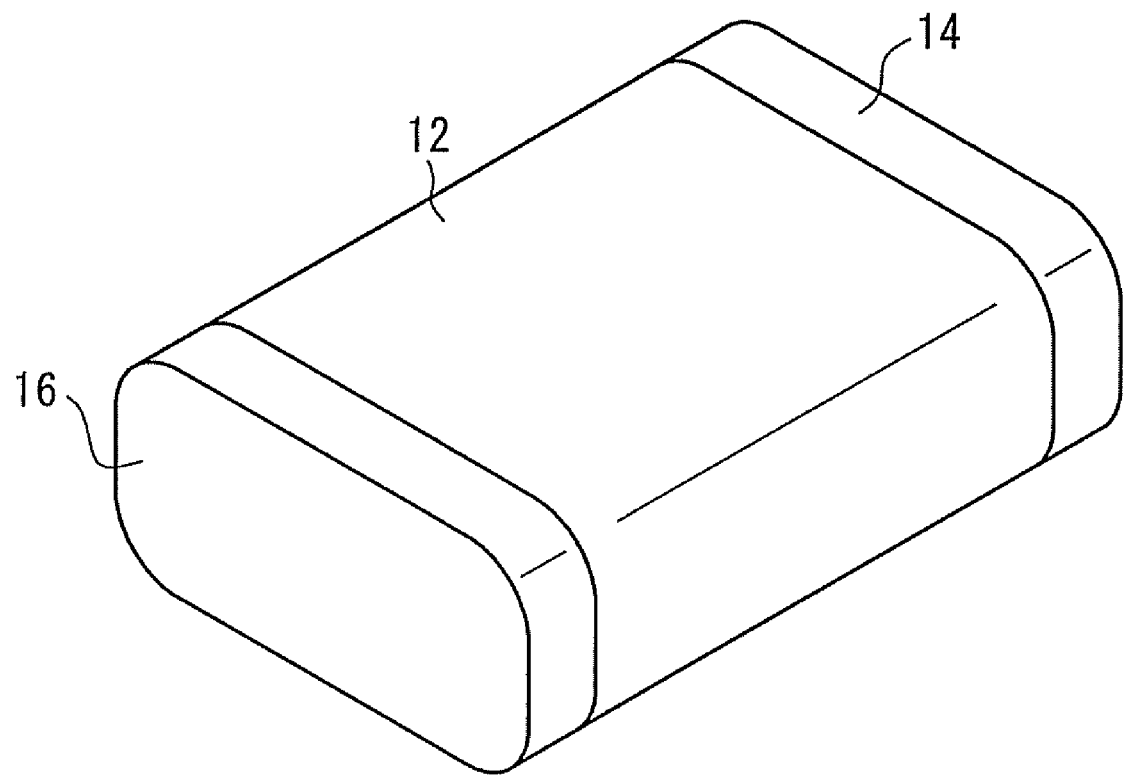
FIG. 5 is a perspective view showing another example of an outer shape of the first film capacitor.

The first film capacitor 10A may have a cylindrical shape, as shown in FIG. 1, or a flat shape, as shown in FIG. 5.

In the event of a fault in the first film capacitor 10A, the capacitance thereof is prevented from being greatly lowered, because the capacitance can be electrically separated by the individual small electrodes 34. The first metal foil 30 and the second metal foil 32, which sandwich the first stacked film assembly 20A on opposite surfaces thereof, can serve as lead-out electrodes. Since the first metal foil 30 and the second metal foil 32 can be formed over a wide area, the foils can effectively be used as a heat radiation path.

The first film capacitor 10A has a high withstand voltage achieved as an advantage of providing the floating electrode 22. Further, the first film capacitor 10A has a heat radiation capability, and both a self-healing function and a self-protective function, and thus, the first film capacitor 10A is capable of being used in various applications.

Figure 6:
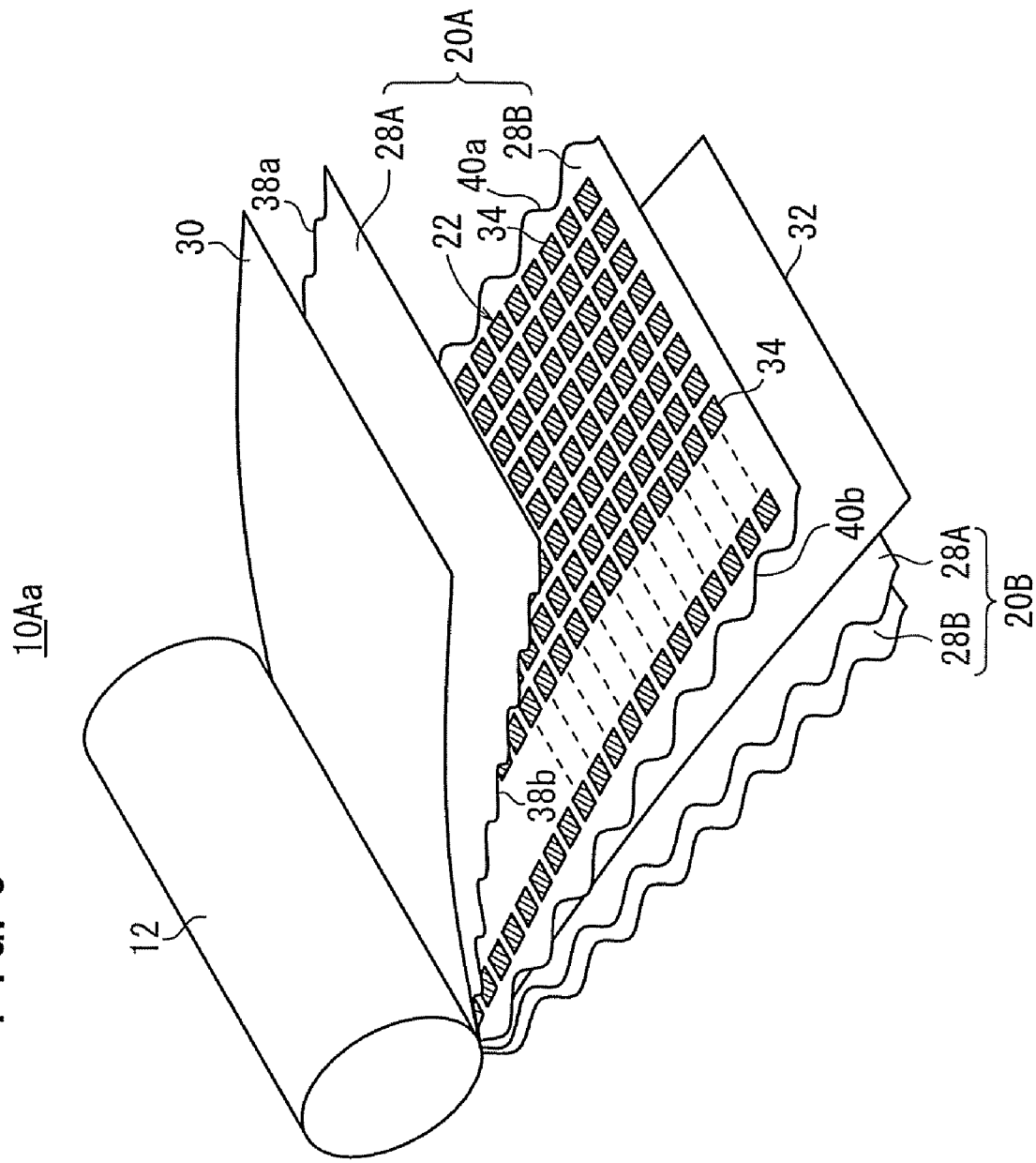
FIG. 6 is a perspective view, partially omitted from illustration, of the structure of a roll according to a modification of the first film capacitor.

FIG. 6 shows a film capacitor 10Aa according to a modification thereof. The first dielectric film 28A has undulated opposite side edges 38a, 38b, whereas the second dielectric film 28B has undulated opposite side edges 40a, 40b. In FIG. 6, the undulated opposite side edges are shown as being shaped in a sine waveform. However, the undulated opposite side edges may also be shaped in a triangular waveform, a semicircular waveform, or the like.

If the side edges 38a, 38b of the first dielectric film 28A and the side edges 40a, 40b of the second dielectric film 28B are straight, then when the components are coiled together to form the roll 12, the first metal foil 30 and the second metal foil 32 are less liable to become exposed from the opposite ends of the roll 12, and therefore, the first metal foil 30 and the second metal foil 32 may not be electrically connected sufficiently to the first terminal 14 and the second terminal 16. In addition, the ends of the roll 12 and the first and second terminals 14, 16 may not be held closely against each other.

However, since the side edges 38a, 38b of the first dielectric film 28A and the side edges 40a, 40b of the second dielectric film 28B are undulated, when the components are coiled together to form the roll 12, the first metal foil 30 and the second metal foil 32 tend to be exposed from opposite ends of the roll 12, and are electrically connected appropriately to the first terminal 14 and the second terminal 16, as well as being held closely against the first and second terminals 14, 16. Accordingly, close contact between the side edges and the terminals prevents a large local current from flowing, thereby making the film capacitor highly reliable.

Figure 7:
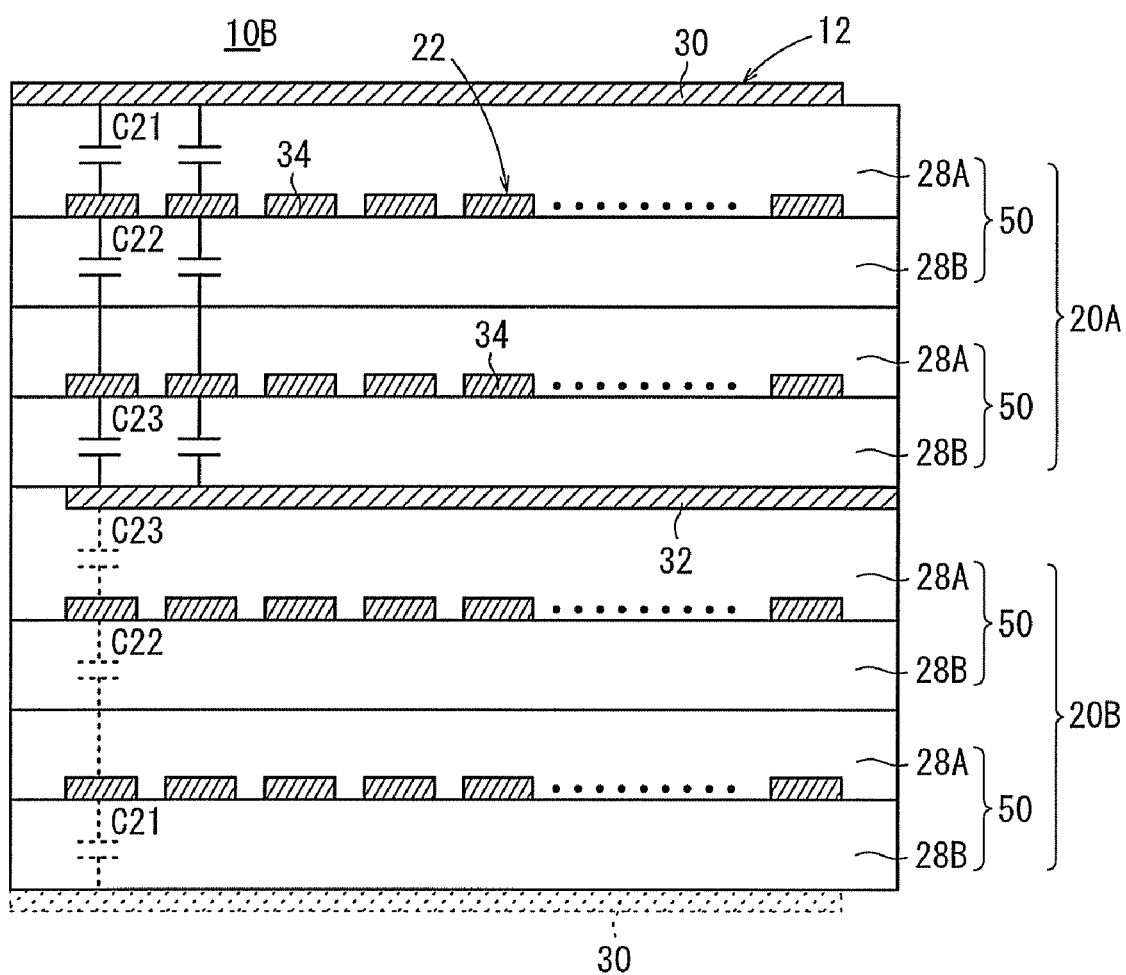
FIG. 7 is a cross-sectional view, partially omitted from illustration, of the structure of a second film capacitor.

As shown in FIG. 7, a film capacitor according to a second embodiment of the present invention (hereinafter referred to as a "second film capacitor 10B") is of essentially the same structure as the first film capacitor 10A, but differs therefrom as follows.

Each of the first stacked film assembly 20A and the second stacked film assembly 20B comprises a stack of alternate first dielectric films 28A and second dielectric films 28B. In FIG. 7, the first stacked film assembly 20A comprises two stacks 50 made up of first dielectric films 28A and second dielectric films 28B. Similarly, the second stacked film assembly 20B comprises two stacks 50 made up of first dielectric films 28A and second dielectric films 28B.

The first metal foil 30 is disposed on the upper surface of the first dielectric film 28A that is positioned on an upper portion of the first stacked film assembly 20A, and the second metal foil 32 is disposed on the lower surface of the second dielectric film 28B that is positioned on a lower portion of the first stacked film assembly 20A. The floating electrode 22 is disposed on a principal surface of each of the second dielectric films.

The roll 12 comprises a coiled stack made up of the first metal foil 30, the first stacked film assembly 20A, the second metal foil 32, and the second stacked film assembly 20B.

In the first stacked film assembly 20A, each of the small electrodes 34 of the floating electrode 22 on one of the second dielectric films 28B and the first metal foil 30 form a twenty-first capacitor C21 therebetween, whereas each of the small electrodes 34 of the floating electrode 22 on the second dielectric film 28B together with a corresponding one of the small electrodes 34 on the other second dielectric film 28B form a twenty-second capacitor C22 therebetween. Each of the small electrodes 34 on the other second dielectric film 28B and the second metal foil 32 form a twenty-third capacitor C23 therebetween. As described above, each of the small electrodes 34 on the other second dielectric film 28B together with a corresponding one of the small electrodes 34 on one of the second dielectric films 28B form the twenty-second capacitor C22 therebetween.

The second stacked film assembly 20B is similar in structure. When the components are coiled together to form the roll 12, the first metal foil 30 is positioned on the lower surface of the second stacked film assembly 20B. Therefore, each of the small electrodes 34 of the floating electrode 22 on one of the second dielectric films 28B of the second stacked film assembly 20B and the first metal foil 30 form a twenty-first capacitor C21 therebetween, whereas each of the small electrodes 34 of the floating electrode 22 on the second dielectric film 28B together with a corresponding one of the small electrodes 34 on the other second dielectric film 28B form a twenty-second capacitor C22 therebetween. Each of the small electrodes 34 on the other second dielectric film 28B and the second metal foil 32 form a twenty-third capacitor C23 therebetween. As described above, each of the small electrodes 34 on the other second dielectric film 28B together with a corresponding one of the small electrodes 34 on one of the second dielectric films 28B form the twenty-second capacitor C22 therebetween.

The second film capacitor 10B also has a high withstand voltage achieved as an advantage of providing the floating electrode 22. Further, the second film capacitor 10B has a heat radiation capability, and both a self-healing function and a self-protective function, and thus, the second film capacitor 10B is capable of being used in various applications.

Figure 8:
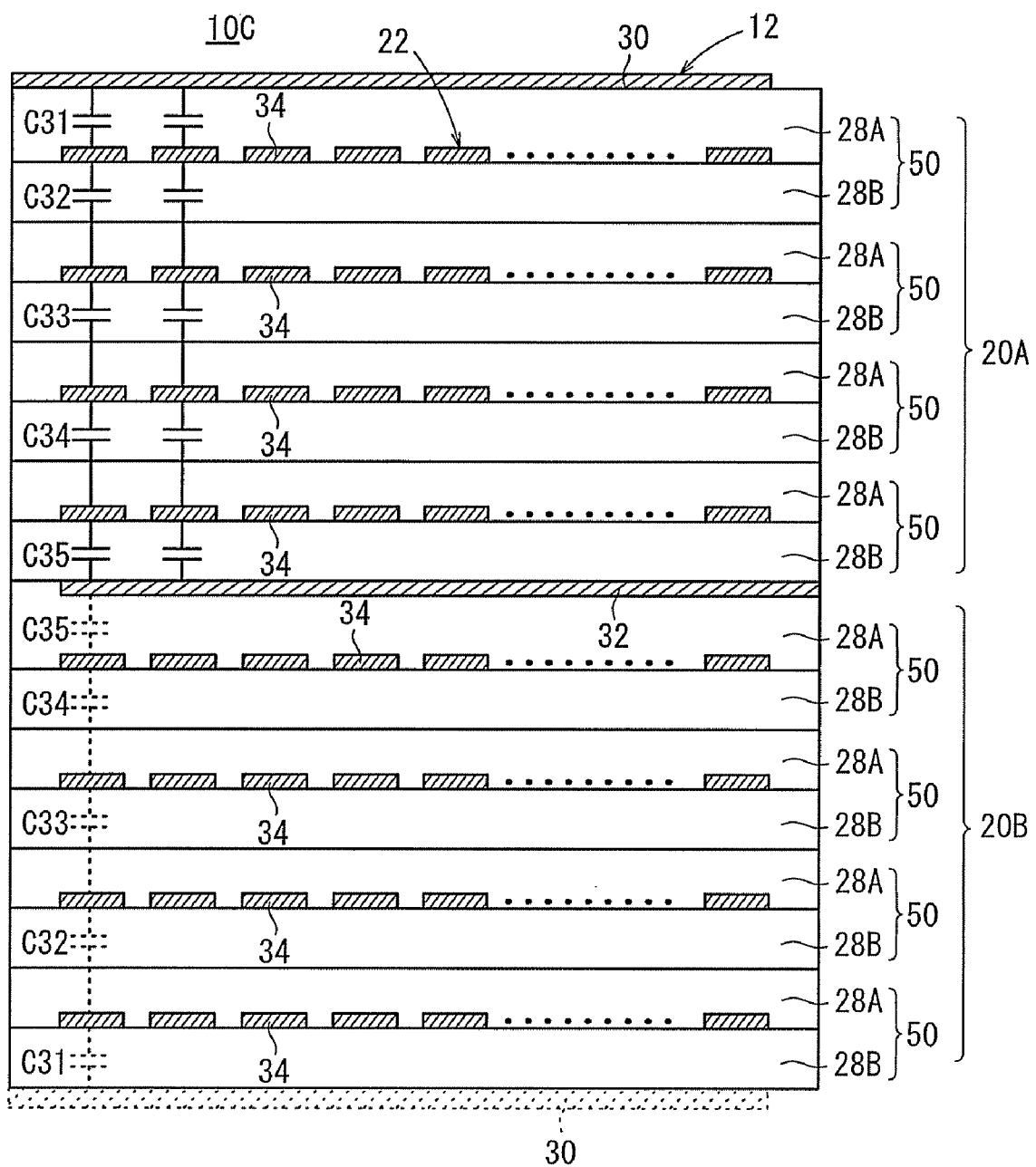
FIG. 8 is a cross-sectional view, partially omitted from illustration, of the structure of a third film capacitor.

As shown in FIG. 8, a film capacitor according to a third embodiment of the present invention (hereinafter referred to as a "third film capacitor 10C") is of essentially the same structure as the second film capacitor 10B, but differs therefrom as follows.

Each of the first stacked film assembly 20A and the second stacked film assembly 20B comprises four stacks 50 made up of first dielectric films 28A and second dielectric films 28B.

In the first stacked film assembly 20A, each of the small electrodes 34 of the floating electrode 22 on one of the second dielectric films 28B of the first stack (the stack 50 made up of the first dielectric film 28A and the second dielectric film 28B closest to the first metal foil 30) and the first metal foil 30 form a thirty-first capacitor C31 therebetween, and each of the small electrodes 34 of the floating electrode 22 on the second dielectric film 28B together with a corresponding one of the small electrodes 34 on the second dielectric film 28B of the adjacent second stack 50 form a thirty-second capacitor C32 therebetween.

As described above, each of the small electrodes 34 on the second dielectric film 28B of the second stack 50 together with a corresponding one of the small electrodes 34 on the second dielectric film 28B of the first stack 50 form the thirty-second capacitor C32 therebetween. Each of the small electrodes 34 on the second dielectric film 28B of the second stack 50 together with a corresponding one of the small electrodes 34 on the second dielectric film 28B of the adjacent third stack 50 form a thirty-third capacitor C33 therebetween.

As described above, each of the small electrodes 34 on the second dielectric film 28B of the third stack 50 together with a corresponding one of the small electrodes 34 on the second dielectric film 28B of the second stack 50 form a thirty-third capacitor C33 therebetween. Each of the small electrodes 34 on the second dielectric film 28B of the third stack 50 together with a corresponding one of the small electrodes 34 on the second dielectric film 28B of the adjacent fourth stack 50 form a thirty-fourth capacitor C34 therebetween.

Each of the small electrodes 34 on the second dielectric film 28B of the fourth stack 50 and the second metal foil 32 form a thirty-fifth capacitor C35. As described above, each of the small electrodes 34 on the second dielectric film 28B of the fourth stack 50 together with a corresponding one of the small electrodes 34 on the second dielectric film 28B of the third stack 50 form the thirty-fourth capacitor C34 therebetween.

The second stacked film assembly 20B is similar in structure. When the components are coiled together to form the roll 12, the first metal foil 30 is positioned on the lower surface of the second stacked film assembly 20B. As with the first stacked film assembly 20A, the second stacked film assembly 20B forms the thirty-first capacitor C31 through the thirty-fifth capacitor C35.

The third film capacitor 10C also has a high withstand voltage achieved as an advantage of providing the floating electrode 22. Further, the third film capacitor 10C has a heat radiation capability, and both a self-healing function and a self-protective function, and thus, the third film capacitor 10C is capable of being used in various applications.

The second film capacitor 10B has two stacks 50 formed by the first dielectric films 28A and the second dielectric films 28B, and the third film capacitor 10C has five stacks 50 formed by the first dielectric films 28A and the second dielectric films 28B. However, the film capacitor according to the present invention may also have three stacks, or five or more stacks.

Figure 9:
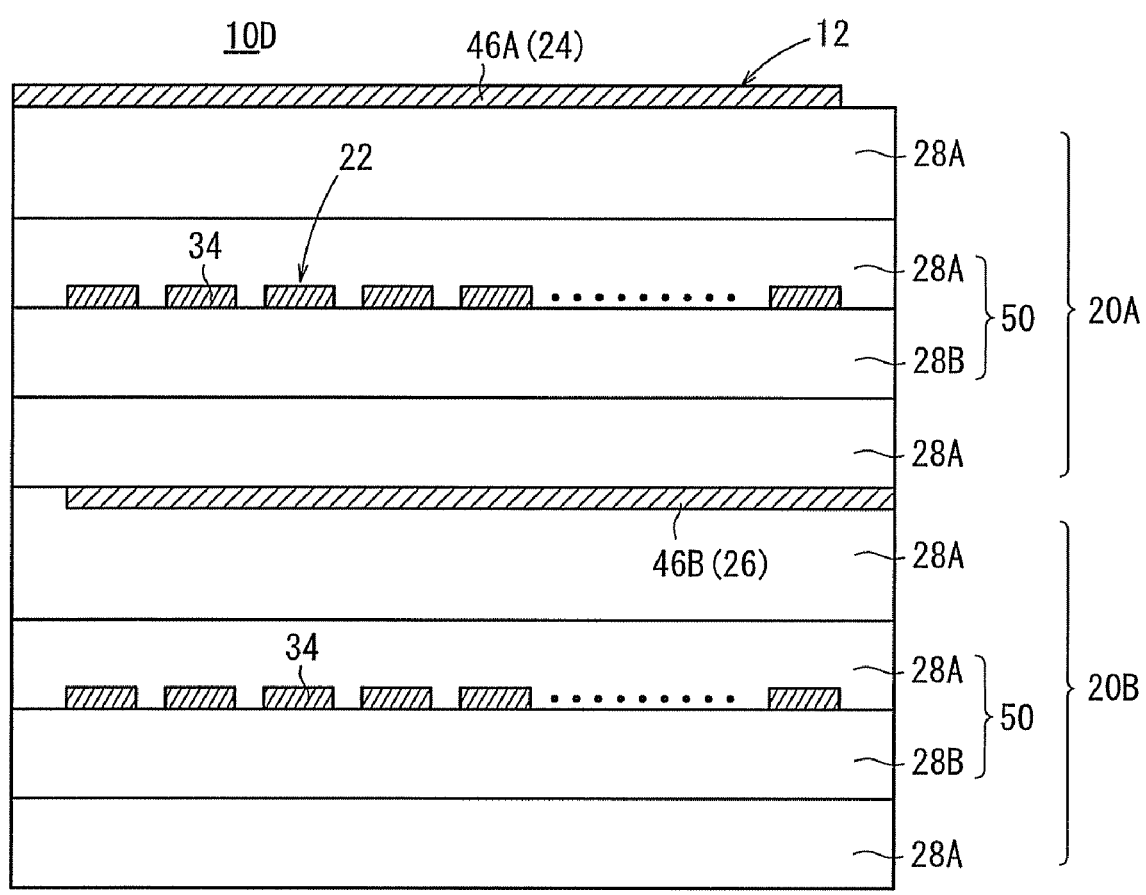
FIG. 9 is a cross-sectional view, partially omitted from illustration, of the structure of a fourth film capacitor.
Figure 10:
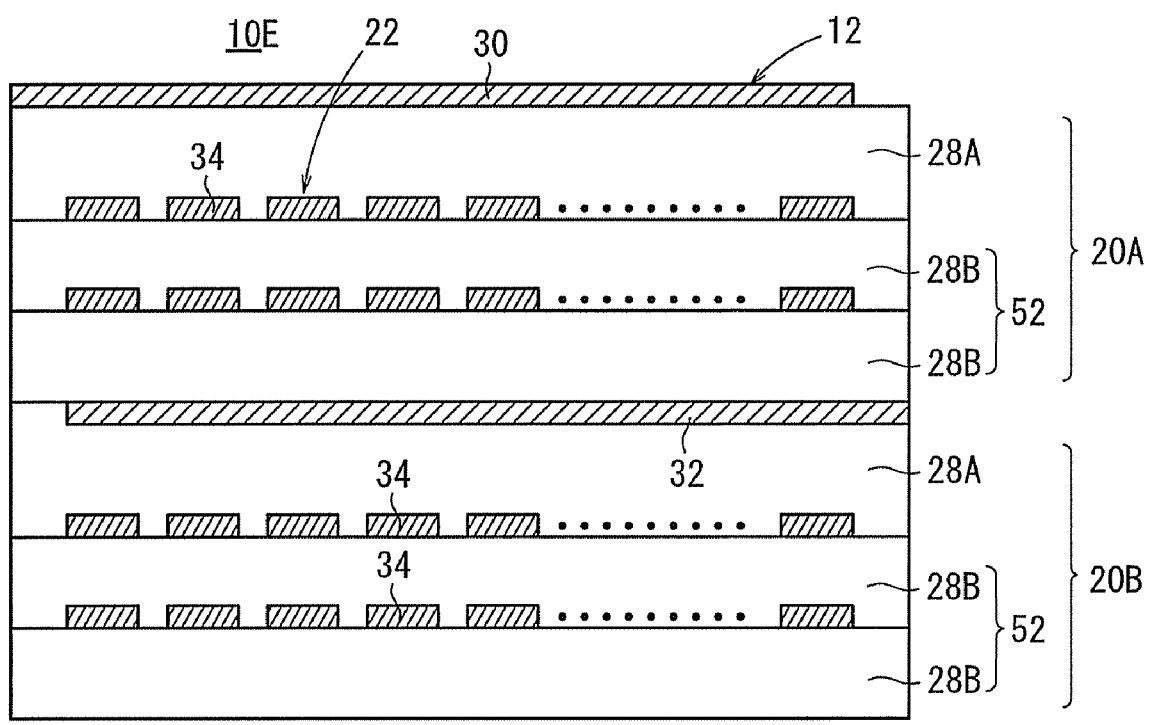
FIG. 10 is a cross-sectional view, partially omitted from illustration, of the structure of a fifth film capacitor.

As shown in FIG. 9, a film capacitor according to a fourth embodiment of the present invention (hereinafter referred to as a "fourth film capacitor 10D") is of essentially the same structure as the first film capacitor 10A, but differs therefrom as follows.

The first stacked film assembly 20A comprises a stack 50 made up of a first dielectric film 28A and a second dielectric film 28B, wherein a first dielectric film 28A is stacked on an upper surface of the stack 50, and a first dielectric film 28A is stacked on a lower surface of the stack 50. The second stacked film assembly 20B is similar in structure. Specifically, the first stacked film assembly 20A includes a rolled stack made up of a first dielectric film 28A with a first lead-out electrode 46A (a first metal film 24) being evaporated on a principal surface (an upper surface) thereof, a stack 50, and a first dielectric film 28A with a second lead-out electrode 46B (a second metal film 26) being evaporated on another principal surface (a lower surface) thereof. The fourth film capacitor 10D also has a high withstand voltage achieved as an advantage of providing the floating electrode 22. Further, the fourth film capacitor 10D has a heat radiation capability, and both a self-healing function and a self-protective function, and thus, the fourth film capacitor 10D is capable of being used in various applications.

In the above embodiments, each of the first stacked film assembly 20A and the second stacked film assembly 20B includes the stack 50 made up of the first dielectric film 28A, which is free of the floating electrode 22, and the second dielectric film 28B that includes the floating electrode 22 therein. However, a film capacitor according to a fifth embodiment of the present invention (hereinafter referred to as a "fifth film capacitor 10E") shown in FIG. 10 includes a stack 52 of two or more second dielectric films 28B each having a floating electrode 22. In the fifth film capacitor 10E shown in FIG. 10, the stack 52 is stacked on the second metal foil 32, the first dielectric film 28A, which is free of the floating electrode 22, is stacked on the stack 52, and the first metal foil 30 is stacked on the first dielectric film 28A. The structure of the stack 52 shown in FIG. 10 also is applicable to the first film capacitor 10A through the fourth film capacitor 10D.

In the first film capacitor 10A through the fifth film capacitor 10E, the first stacked film assembly 20A and the second stacked film assembly 20B are of the same stacked structure. However, the first stacked film assembly 20A and the second stacked film assembly 20B may be of different stacked structures, respectively.

The film capacitor according to the present invention is not limited to the above embodiments, and various changes and modifications may be made to the embodiments without departing from the scope of the invention as set forth in the appended claims.

The invention claimed is:

1. A film capacitor comprising a roll having a stacked structure, including a first stacked film assembly, which has a stack of dielectric films including a floating electrode therein, a first metal film and a second metal film disposed in sandwiching relation to the first stacked film assembly on opposite surfaces thereof, and a second stacked film assembly, which has a stack of dielectric films including a floating electrode therein, a first terminal electrically connected to an end of the roll, and a second terminal electrically connected to another end of the roll;

wherein the floating electrode comprises a cluster of small electrodes that are independent of each other;

each of the small electrodes and the first metal film form a capacitor therebetween, and each of the small electrodes and the second metal film form a capacitor therebetween;

the first metal film extends to a side edge of the first stacked film assembly so as to be electrically connected to the first terminal; and the second metal film extends to another side edge of the first stacked film assembly so as to be electrically connected to the second terminal.

2. A film capacitor according to claim 1, wherein the first stacked film assembly comprises at least one stack made up of a dielectric film, which is free of the floating electrode, and a dielectric film that includes the floating electrode therein.

3. A film capacitor according to claim 1, wherein the first stacked film assembly comprises at least one stack made up of at least two dielectric films, each having the floating electrode.

4. A film capacitor according to claim 1, wherein the small electrodes are formed by evaporating a metal film onto one of the dielectric films of the first stacked film assembly.

5. A film capacitor according to claim 4, wherein each of the small electrodes is of a rectangular shape, the small electrodes being arrayed in a matrix on the dielectric film.

6. A film capacitor according to claim 4, wherein each of the small electrodes is of a hexagonal shape, the small electrodes being arrayed in a honeycomb pattern on the dielectric film.

7. A film capacitor according to claim 1, wherein the first metal film is evaporated onto a principal surface of a dielectric film stacked on a stack of the dielectric films, and the second metal film is evaporated onto a principal surface of another dielectric film stacked on the stack.

8. A film capacitor according to claim 1, wherein the dielectric films that make up the first stacked film assembly and the second stacked film assembly have transversely opposite undulated edges.

* * * * *